United States Patent
Brown et al.

(10) Patent No.: US 9,524,649 B1
(45) Date of Patent: Dec. 20, 2016

(54) CURRICULUM CUSTOMIZATION FOR A PORTABLE ELECTRONIC DEVICE

(75) Inventors: Monica Brown, Berkeley, CA (US); Maureen Bunney, Mill Valley, CA (US); Jennifer Whitley, San Francisco, CA (US); Elizabeth Young, San Francisco, CA (US); Teresa Cameron, Huntington Beach, CA (US); Nicole Nicodemus, Berkeley, CA (US)

(73) Assignee: Leapfron Enterprises, Inc., Pasadena, CA (US)

( * ) Notice: Subject to any disclaimer, the term of this patent is extended or adjusted under 35 U.S.C. 154(b) by 1597 days.

(21) Appl. No.: 12/210,894

(22) Filed: Sep. 15, 2008
(Under 37 CFR 1.47)

Related U.S. Application Data

(60) Provisional application No. 60/998,028, filed on Oct. 5, 2007.

(51) Int. Cl.
| | | |
|---|---|---|
| *G09B 5/00* | (2006.01) | |
| *G09B 5/04* | (2006.01) | |
| *G09B 5/08* | (2006.01) | |
| G09B 7/00 | (2006.01) | |
| G09B 5/06 | (2006.01) | |
| G09B 7/04 | (2006.01) | |

(52) U.S. Cl.
CPC . *G09B 5/00* (2013.01); *G09B 5/08* (2013.01); *G09B 5/06* (2013.01); *G09B 7/00* (2013.01); *G09B 7/04* (2013.01)

(58) Field of Classification Search
CPC ............... G09B 5/00; G09B 5/04; G09B 7/00; G09B 7/04
USPC .......................................... 434/322–323, 350
See application file for complete search history.

(56) References Cited

U.S. PATENT DOCUMENTS

| 5,002,491 | A | * | 3/1991 | Abrahamson et al. ........ 434/322 |
| 5,173,051 | A | * | 12/1992 | May et al. ..................... 434/118 |
| 5,385,475 | A | * | 1/1995 | Sudman et al. .......... 434/307 R |
| 5,441,415 | A | * | 8/1995 | Lee et al. ...................... 434/350 |
| 5,864,869 | A | | 1/1999 | Doak et al. |
| 6,064,856 | A | * | 5/2000 | Lee et al. ...................... 434/350 |
| 6,075,968 | A | * | 6/2000 | Morris et al. ................. 434/350 |
| 6,091,930 | A | * | 7/2000 | Mortimer et al. ............ 434/362 |
| 6,178,308 | B1 | * | 1/2001 | Bobrow et al. ............... 434/350 |

(Continued)

*Primary Examiner* — Robert J Utama
(74) *Attorney, Agent, or Firm* — Kilpatrick Townsend & Stockton LLP

(57) ABSTRACT

A method, system and portable electronic device for customizing a curriculum and implementing the customized curriculum on the portable electronic device is disclosed. Embodiments are directed to a user interface for customizing a curriculum to be presented during execution of a content title by the portable electronic device. Data may be generated based upon the customization and downloaded to the portable electronic device for implementing the customized curriculum during execution of the content title by the portable electronic device. The customization may involve a limiting of one or more features of the content, adding additional content, removing some or all of previously-customized curriculum, etc. Additionally, usage data associated with the portable electronic device may be uploaded for presenting progress data via the graphical user interface. Accordingly, a parent may use the graphical user interface to monitor their child's progress and/or customize a curriculum for implementation on a portable electronic device.

19 Claims, 13 Drawing Sheets

(56) References Cited

U.S. PATENT DOCUMENTS

| | | | |
|---|---|---|---|
| 6,211,868 B1* | 4/2001 | Lin et al. | 715/251 |
| 6,470,171 B1* | 10/2002 | Helmick et al. | 434/362 |
| 6,505,031 B1* | 1/2003 | Slider et al. | 434/350 |
| 6,533,583 B1* | 3/2003 | Sportelli | 434/118 |
| 6,865,368 B2* | 3/2005 | Hoyashita et al. | 434/350 |
| 2002/0055089 A1* | 5/2002 | Scheirer | 434/350 |
| 2002/0138841 A1* | 9/2002 | Ward | 725/78 |
| 2002/0184159 A1* | 12/2002 | Tadayon et al. | 705/54 |
| 2003/0028588 A1* | 2/2003 | McConnell et al. | 709/203 |
| 2003/0039948 A1* | 2/2003 | Donahue | 434/322 |
| 2003/0039949 A1* | 2/2003 | Cappellucci et al. | 434/362 |
| 2003/0074210 A1* | 4/2003 | Matsuda et al. | 705/1 |
| 2004/0161728 A1* | 8/2004 | Benevento et al. | 434/118 |
| 2005/0019739 A1* | 1/2005 | Cunningham et al. | 434/350 |
| 2005/0069849 A1* | 3/2005 | McKinney et al. | 434/178 |
| 2005/0110461 A1* | 5/2005 | McConnell et al. | 320/116 |
| 2005/0204337 A1* | 9/2005 | Diesel et al. | 717/113 |
| 2005/0216417 A1* | 9/2005 | Risan et al. | 705/52 |
| 2005/0266906 A1* | 12/2005 | Stevens | 463/1 |
| 2005/0287510 A1* | 12/2005 | Sumrall et al. | 434/353 |
| 2006/0105313 A1* | 5/2006 | Mansfield et al. | 434/350 |
| 2008/0268414 A1* | 10/2008 | Fung | 434/308 |
| 2009/0017436 A1* | 1/2009 | Sumrall et al. | 434/433 |
| 2010/0167255 A1* | 7/2010 | Shane et al. | 434/307 R |

* cited by examiner

CURRICULUM CUSTOMIZATION FOR A PORTABLE ELECTRONIC DEVICE

RELATED APPLICATIONS

The present application is related to and claims the benefit of U.S. Provisional Patent Application No. 60/998,028, filed Oct. 5, 2007, entitled "CREATE YOUR OWN (CYO) GAME PLAY," naming Elizabeth Young as the inventor, assigned to the assignee of the present invention. That application is incorporated herein by reference in its entirety and for all purposes.

BACKGROUND OF THE INVENTION

Educational gaming systems are purchased by parents for their children to promote learning, mental growth, entertainment, and the like. The computerized systems often display information to the child and the child may interact with the displayed information using buttons on the computer. Additionally, various content titles may be purchased for the gaming systems, thereby expanding the functionality of the gaming system and providing children with a variety of educational games and other activities.

Although educational gaming systems may enhance learning, it is difficult for parents to monitor their child's progress. For example, children often use the gaming systems out of eyeshot or earshot of the parents. Additionally, educational gaming systems are often used in the car or during another activity requiring the parent's attention. Accordingly, parents are often unable to determine material which is troublesome for the child, offer assistance to aid or target the child's learning of the select material, or the like.

Additionally, even if a parent were to become aware of troubling material, most conventional gaming system do not enable a child to focus on the select material. For example, a child must often wade through other less-troubling material before the conventional gaming system will again present the more-select material. Although parents may change content titles and/or initiate a new level or game within a title, this is often insufficient to adequately focus on the select material. For example, if a child struggles with division by the number five, initiating a game or level which concentrates on the broader concept of division may provide insufficient coverage of division by the number five to help the child learn the material.

SUMMARY OF THE INVENTION

Accordingly, a need exists for an educational gaming system which enables parents to monitor the progress of and usage by their children. Additionally, a need exists for an educational gaming system which enables parents to direct or customize the curriculum presented on the education gaming system to emphasize or target select material for the child. Embodiments of the present invention provide novel solutions to these needs and others as described below.

In one embodiment, a handheld computerized device is able to play educational games with a child interacting with the device. The interaction is both aural and visual. The content of the game may be customized. In one example, the content can be customized for a particular user. In one example, a specific spelling list can be incorporated into the existing game play to stress certain words to the child. Likewise, customized multiplication tables can be implemented into the existing game play to emphasize certain math exercises. Likewise, the games can be customized to emphasize certain skill levels within the game that a parent may want to emphasize. In other instances, other content like graphic images, moving imagery, etc., may be implemented into the existing game play to enhance the amusement of the device for a particular user. A host computer system (e.g., separate from the handheld computerized device) can be used to define the customization.

The device may also monitor the game play by a child and the child's interactions with the handheld computerized device. The time that a child stays in any portion of the game may also be monitored. The monitored information can be uploaded to a host computer system (e.g., separate from the handheld computerized device).

Embodiments of the present invention are directed to a method, system and portable electronic device (e.g., an educational gaming system) for customizing a curriculum and implementing the customized curriculum on the portable electronic device. More specifically, embodiments are directed to a user interface for customizing a curriculum to be presented during execution of a content title (e.g., an educational game) by the portable electronic device. Data may be generated based upon the customization (e.g., by a parent interacting with the graphical user interface) and downloaded to the portable electronic device for implementing the customized curriculum during execution of the content title by the portable electronic device. The customization may involve a limiting of one or more features of the content (e.g., to focus on troublesome material), adding additional content (e.g., a spelling list or other material for the child to study), removing some or all of previously-customized curriculum, etc. Additionally, usage data associated with the portable electronic device may be uploaded (e.g., to the computer system implementing the graphical user interface) for presenting progress data (e.g., to parents) via the graphical user interface (e.g., to help parents determine how to customize the curriculum for the child's needs). Accordingly, a parent may use the graphical user interface to monitor a child's progress and/or customize a curriculum for implementation on the portable electronic device.

In one embodiment, a method of customizing a curriculum for implementation on a portable electronic device includes presenting a user interface for customizing the curriculum, wherein the curriculum is associated with a game that is operable on the portable electronic device. User interaction with the user interface is detected, wherein the user interaction includes a user-customization of the curriculum. Data is generated for implementing customized curriculum on the portable electronic device, wherein the generating the data further includes generating the data for implementing the customized curriculum based upon the user-customization of the curriculum. Additionally, the data is downloaded to the portable electronic device. The method may also include automatically associating the data with the user in response to a selection of the user for association with the customized curriculum. Additionally, the method may include, in response to a selection of at least one content title executable by the portable electronic device, associating the user-customization of the curriculum with the content title, wherein the generating the data further includes generating the data for implementing the customized curriculum during execution of the content title.

In another embodiment, a method of implementing customized curriculum on a portable electronic device includes, in response to a coupling of the portable electronic device to a component storing curriculum customization data, automatically downloading the curriculum customization data to the portable electronic device, wherein the component is separate from the portable electronic device, and wherein the curriculum customization data includes a user-generated configuration for a content title. The content title is executed on the portable electronic device, wherein the executing includes implementing the customized curriculum on the portable electronic device during execution of the content title, wherein the implementing the customized curriculum further includes implementing the customized curriculum based upon the curriculum customization data. The method may also include, in response to a request to exit the customized curriculum, implementing non-customized curriculum on the portable electronic device during execution of the content title. Additionally, the method may include collecting usage information associated with the customized curriculum and uploading the usage information from the portable electronic device to the component for generation of progress information associated with the customized curriculum.

In yet another embodiment, a portable electronic device includes an interface component for coupling to an external component storing curriculum customization data, wherein the curriculum customization data includes a user-generated configuration for a content title. The portable electronic device also includes a memory, at least one output component, and at least one input component. A processor is coupled to the memory and the interface component, wherein the processor is operable to automatically download the curriculum customization data to the memory in response to a coupling of the interface component to the external component. The processor is also operable to execute the content title and implement the customized curriculum using the at least one output device and the at least one input device, the processor further operable to implement the customized curriculum during execution of the content title based upon the curriculum customization data. The processor may further be operable to implement non-customized curriculum during execution of the content title and in response to a request to exit the customized curriculum. Additionally, the processor may further be operable to collect usage information associated with the customized curriculum and upload the usage information to the component for generation of progress information associated with the customized curriculum.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
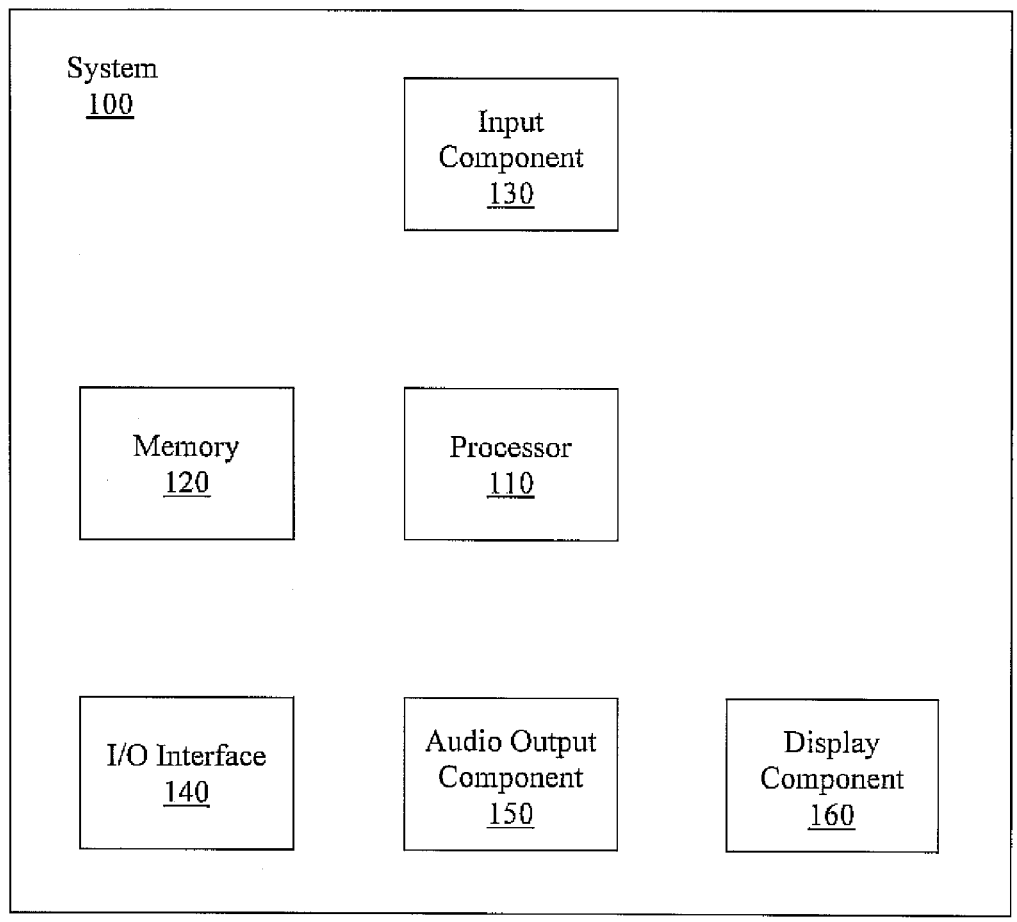
FIG. 1 shows an exemplary computer system in accordance with one embodiment of the present invention.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "adding," "adjusting," "analyzing," "applying," "assembling," "assigning," "balancing," "blocking," "calculating," "capturing," "combining," "comparing," "collecting," "creating," "debugging," "defining," "depicting," "detecting," "determining," "displaying," "establishing," "executing," "flipping," "generating," "grouping," "hiding," "identifying," "initiating," "interacting," "modifying," "monitoring," "moving," "outputting," "performing," "placing," "presenting," "processing," "programming," "querying," "removing," "repeating," "resuming," "sampling," "simulating," "sorting," "storing," "subtracting," "suspending," "tracking," "transcoding," "transforming," "unblocking," "using," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

FIG. 1 shows exemplary computer system 100 in accordance with one embodiment of the present invention. System 100 may implement a general-purpose computer system, an embedded computer system, a laptop computer system, a hand-held computer system, a portable computer system, a portable electronic device, a stand-alone computer system, a game console, some combination thereof, etc. As shown in FIG. 1, system 100 includes processor 110, memory 120, input component 130, I/O interface 140, audio output component 150, and display component 160. Although system 100 is depicted with specific components in FIG. 1, it should be appreciated that system 100 may comprise additional components, fewer components, different components, a different configuration of components, etc., in other embodiments.

Input component 130 may include a button, keypad, joystick, touch screen (e.g., disposed over display device 160), or other user input device. Audio output component 150 may include a speaker or other component capable of emitting sound. Display component 160 may include a liquid crystal display (LCD), light emitting diode (LED) display (e.g., OLED, TOLED, etc.), or other light-emitting component capable of generating images or graphical objects.

As shown in FIG. 1, input/output (I/O) interface 140 may implement a communication channel or interface with components, devices, systems, etc., external to system 100. For example, I/O interface 140 may implement a communication interface in accordance with the USB standard (e.g., USB 1.0, USB 2.0, etc.), the Firewire standard, the Ethernet standard, etc. Alternatively, I/O interface 140 may implement a wireless communication interface. Accordingly, data may be communicated between system 100 and other components, devices, systems, etc., where data accessed by I/O interface 140 may be communicated to processor 110 for further processing in one embodiment.

In one embodiment, system 100 may implement a portable electronic device or educational gaming system capable of accessing content (e.g., a content title, educational game, other software executable by the portable electronic device, etc.) stored in memory 120. Memory 120 may be random access memory (RAM), read-only memory (ROM), removable memory (e.g., a removable memory cartridge, removable memory card, etc.), some combination thereof, etc. A content title may include at least one game (e.g., educational games), where each game may include at least one level. In this manner, each content title may present a variety of information (e.g., multiplication operations, division operations, other mathematical operations) related to a subject matter (e.g., math), where a user may interact with the content using one or more components (e.g., input component 130) of portable electronic device (e.g., 100). The educational information presented by the system (e.g., 100) during execution of the content title or other software may be referred to as a "curriculum," a "customized curriculum," or the like, in one embodiment. Additionally, as used herein, the term "game play" may be used to refer to presentation of a set of questions (e.g., math problems, spelling questions, science questions, etc.) and/or any other activity (e.g., a hangman game, etc.) with the motive of eliciting a response (e.g., a correct answer, incorrect answer, etc., to the questions or activity such as hangman) from a user, where the questions and/or activities may be presented using a system (e.g., 100).

In one embodiment, system 100 may be a personal computer system or the like. As such, curriculum may be customized (e.g., as discussed with respect to other Figures herein) for presentation on personal computer system 100, where a child or other user may access the customized curriculum during interaction with and/or game play implemented by personal computer system 100. Further, it should be appreciated that the child or user may use a web browser or other graphical user interface implemented by personal computer system 100 to interact and/or access the customized curriculum. In one embodiment, the game play implemented by personal computer system 100 may be an online virtual world.

Figure 2:
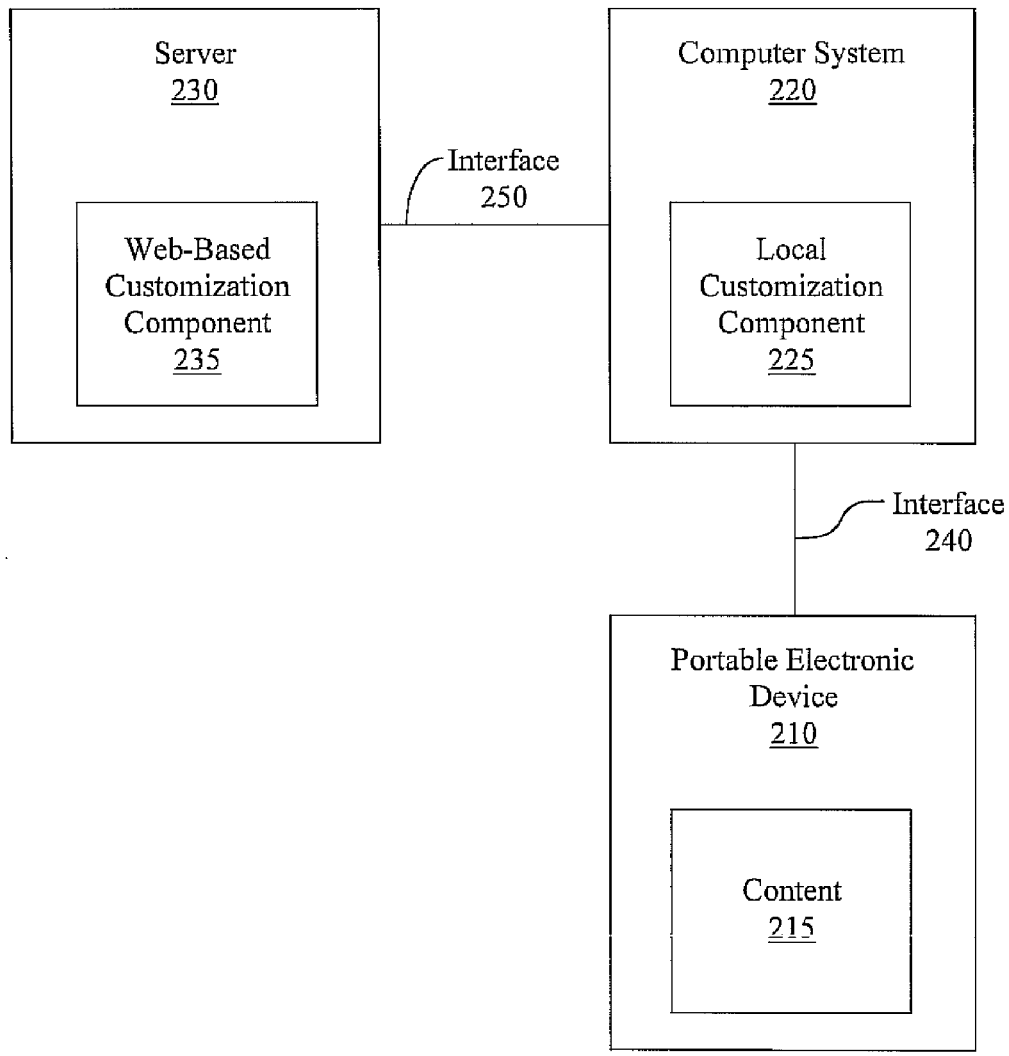
FIG. 2 shows an exemplary system for customizing a curriculum for implementation on a portable electronic device in accordance with one embodiment of the present invention.

FIG. 2 shows exemplary system 200 for customizing a curriculum for implementation on a portable electronic device in accordance with one embodiment of the present invention. Device 210, computer system 220, server 230, or some combination thereof, may be implemented in accordance with system 100 in one embodiment. Additionally, it should be appreciated that the coupling of device 210, computer system 220, and server 230 is merely exemplary, and that system 200 may be alternatively configured (e.g., device 210 may connect directly to server 230, device 210 may be coupled to server 230 and/or computer system 220 via at least one component not depicted in FIG. 2, etc.) in other embodiments.

As shown in FIG. 2, portable electronic device 210 is communicatively coupled to computer system 220 (e.g., which includes local customization component 225) by interface 240, and server 230 (e.g., which includes web-based customization component 235) is coupled to computer system 220 by communication interface 250. Component 225 and/or component 235 may implement a graphical user interface (GUI), such as that depicted in FIGS. 3 through 8, for customizing a curriculum (e.g., implemented during execution of content 215 by portable electronic device 210). Curriculum customization data may be generated based upon the user-customization of the curriculum (e.g., customized using the GUI implemented by component 225 and/or component 235) and downloaded to portable electronic device 210 (e.g., automatically downloaded over interface 240 in response to a coupling of portable electronic device 210 and computer system 220).

During execution of content 215 by portable electronic device 210, device 210 may access the curriculum customization data (e.g., stored in a memory, such as memory 120 of FIG. 1, of device 210) and customize the curriculum presented during execution of content 210 accordingly. The customization of the curriculum may involve a limiting of one or more features of the content (e.g., 215). For example, less-troublesome material (e.g., determined by a user, such as a parent, interacting with the GUI implemented by component 225 and/or component 235) may be limited or removed from the customized curriculum, thereby enabling a user (e.g., a child) of the portable electronic device (e.g., 210) to focus on more troublesome material (e.g., indicated by feedback or progress information based upon usage data collected by device 210 and fed back to computer system 220). In another embodiment, the customization may involve adding new or additional content to the curriculum. For example, a spelling list or other material which is not part of the curriculum may be added using component 225 and/or component 235, thereby expanding the functionality of device 210 and implementing a curriculum which is more relevant and helpful to the user (e.g., of device 210) in one embodiment. And in another embodiment, the customization may involve removing some or all of a previously-customized curriculum. For example, a user (e.g., a parent) interacting with the GUI (e.g., implemented by component 225 and/or component 235) may remove curriculum material which is no longer relevant (e.g., a spelling list which has already been tested in the child's classroom), which should be replaced by other curriculum material, etc.

As shown in FIG. 2, the GUI for customizing curriculum may be implemented by component 225, where component 225 is run locally on computer system 220. In this manner, the customized curriculum may be generated and implemented (e.g., on device 210) without a connection to the Internet and/or without a connection to an external network in one embodiment.

Alternatively, the GUI for customizing curriculum may be implemented by component 225 and component 235. For example, component 225 may be a web browser for presenting web pages and other information from the Internet. Component 235 may include data and/or system resources (e.g., data processing resources, data storage resources, etc.) used to generate a web-based GUI (e.g., a web-based tool for customizing a curriculum or other content). As such, component 225 may communicate with server 230 to access data (e.g., stored on server 230, stored in another component accessible to server 230, etc.) used to present the GUI (e.g., on computer system 220), thereby enabling a user to customize a curriculum implemented on portable electronic device 210. It should be appreciated that computer system 220 may communicate data (e.g., usage information communicated from device 210) to server 230 to implement the GUI in one embodiment.

Interface 240 and/or interface 250 may include one or more components (e.g., networks, network components, computer systems, etc.) in one embodiment. Additionally, Interface 240 and/or interface 250 may be coupled to or otherwise utilize the Internet to communicate data. In one embodiment, interface 240 and/or interface 250 may implement a communication interface in accordance with the USB standard (e.g., USB 1.0, USB 2.0, etc.), the Firewire standard, the Ethernet standard, etc. Alternatively, Interface 240 and/or interface 250 may implement a wireless communication interface.

As shown in FIG. 2, portable electronic device 210 may collect usage information based on user interaction with device 210 in one embodiment. The usage information may be related to the customized curriculum (e.g., generated using the GUI implemented by component 225 and/or component 235) and/or non-customized curriculum (e.g., un-modified or default curriculum included as part of content 215).

The usage information collected by the portable electronic device (e.g., 210) may include the name of at least one content title played by a user. The usage information may include information about the curriculum accessed by a user. For example, the subject matter of the curriculum (e.g., math, spelling, science, etc.) may be included. Also, the information about the curriculum may include one or more games played by a user within the content title. The information may include one or more levels accessed by the user during game play in one embodiment.

The usage information may include information about how a user responded to questions during game play. For example, the usage information may include a number of questions answered correctly by a user, a number of wrong answers, etc.

In one embodiment, the usage information may include information about the time spent by a user on a portion of a content title (e.g., a level, a game within a content title, etc.). The usage information may include the number of times a user accessed a "hint" button or otherwise requested assistance. And in one embodiment, the usage information may include portions of the actual curriculum (e.g., an example of a question to which a wrong answer was provided), where the portions of the actual curriculum may provide context for other usage data (e.g., the number of questions answered incorrectly by a user).

The usage data may be transferred to computer system 220 (e.g., automatically upon coupling device 210 to computer system 220) and/or server 230. The usage data may be processed to generate progress information in one embodiment. The progress information may then be displayed or presented using the GUI (e.g., implemented using component 225 and/or component 235). Alternatively, the usage data (e.g., generated by device 210) may be presented directly or in raw form. In this manner, a user of the GUI (e.g., a parent) may use the progress information to determine intelligently how to customize the curriculum for the user of device 210 (e.g., a child of the parent).

Figure 3:
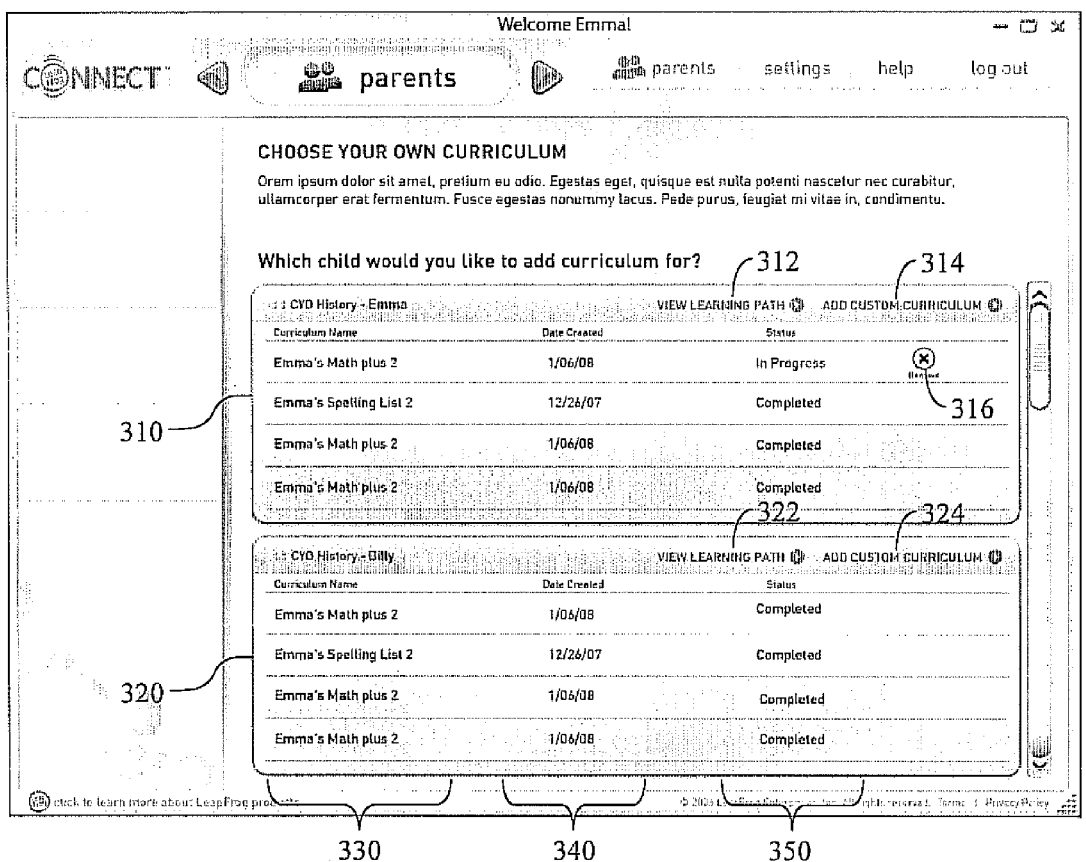
FIG. 3 shows an exemplary on-screen graphical user interface for managing at least one curriculum to be implemented on a portable electronic device in accordance with one embodiment of the present invention.

FIG. 3 shows exemplary on-screen GUI 300 for managing at least one curriculum to be implemented on a portable electronic device in accordance with one embodiment of the present invention. GUI 300 may be implemented by component 225 and/or component 235 of FIG. 2 in one embodiment. As shown in FIG. 3, GUI 300 includes region 310 for managing at least one curriculum for a first user (e.g., of portable electronic device 210), and also includes region 320 for managing at least one curriculum for a second user (e.g., of device 210). It should be appreciated that GUI 300 may include any number of user-specific regions in other embodiments.

Information within regions 310 and 320 is organized into columns 330-350, where each row of regions 310 and 320 may correspond to a given customized curriculum in one embodiment. Column 330 may indicate a user-specified name for each customized curriculum. Column 340 may indicate a date on which each customized curriculum was created. Column 350 may indicate a status of each customized curriculum, where the status may indicate that a user has and/or has not completed a customized curriculum in one embodiment.

As shown in FIG. 3, interaction with graphical object 312 of GUI 300 may initiate a presentation of progress information for the first user (e.g., corresponding to region 310), while interaction with graphical object 322 of GUI 300 may initiate a presentation of progress information for the second user (e.g., corresponding to region 320). The progress information may indicate a user's progress through one or more content titles, where the progress information may be viewed in varying levels of detail (e.g., overall completion of the entire curriculum of the content title, completion of various levels or tasks related to one of the curriculums of the content title, etc.). Additionally, the progress information may include raw usage data (e.g., generated by device 210) related to one or more content titles. In this manner, a user of GUI 300 (e.g., a parent) may use the progress information to determine how to customize a curriculum for a user of device 210 (e.g., a child of the parent).

Interaction with graphical object 314 of GUI 300 may initiate a presentation of a GUI (e.g., depicted in FIGS. 5 through 8) for customizing a curriculum (e.g., to be implemented on device 210) for the first user (e.g., corresponding to region 310), while interaction with graphical object 324 of GUI 300 may initiate a presentation of a GUI (e.g., depicted in FIGS. 5 through 8) for customizing a curriculum (e.g., to be implemented on device 210) for the second user (e.g., corresponding to region 320). The curriculum to be customized may be selected within the customization GUI (e.g., depicted in FIGS. 5 through 8). Alternatively, interaction with a row or a portion of a row may initiate a presentation of a GUI (e.g., depicted in FIGS. 5 through 8) for customizing a curriculum associated with the row in one embodiment, thereby enabling a user to modify an existing customized curriculum. Once the customized curriculum is created and/or saved, GUI 300 may display an additional row corresponding to the newly-created customized curriculum in region 310 or 320 (e.g., depending upon whether the interaction was with graphical object 314 or 324, respectively).

Additionally, a customized curriculum or a portion thereof may be removed from GUI 300. For example, interaction with graphical object 316 may remove the customized curriculum associated with the first row in region 310. Once removal of the curriculum is requested (e.g., using GUI 400 of FIG. 4), the portable electronic device may implement other curriculum (e.g., default or non-customized curriculum, another customized curriculum, etc.) upon connection of the device (e.g., 210) to a computer system (e.g., 220).

Figure 4:
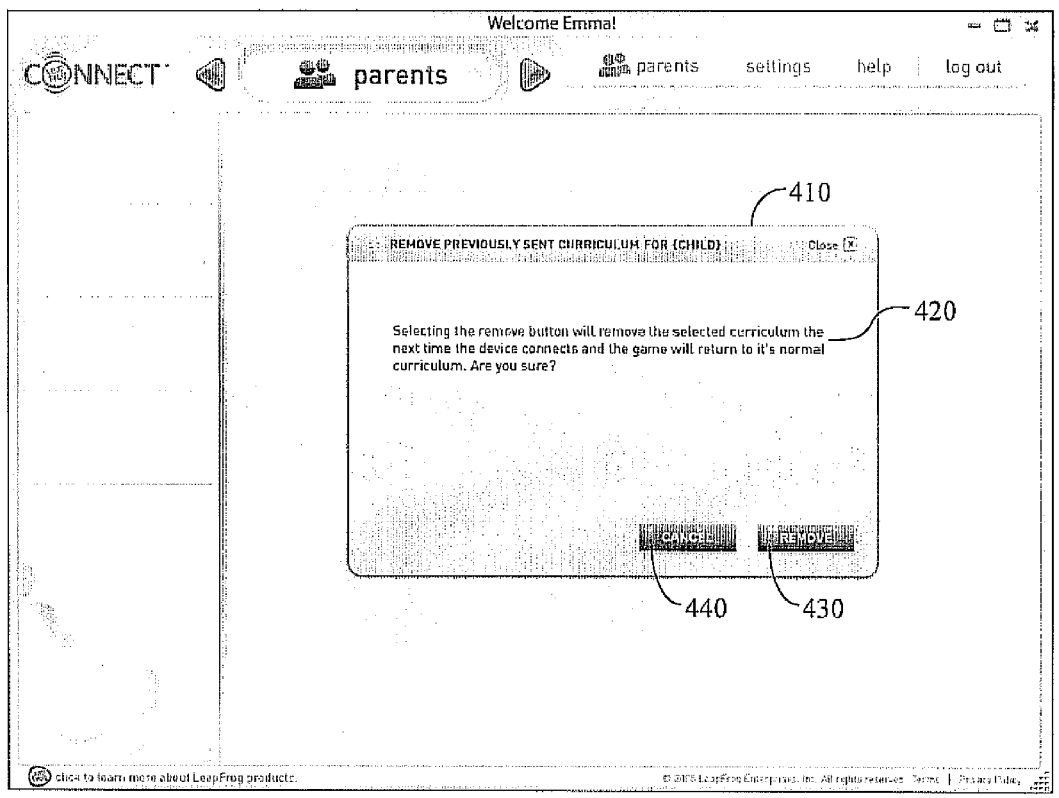
FIG. 4 shows an exemplary on-screen graphical user interface for removing a customized curriculum in accordance with one embodiment of the present invention.

FIG. 4 shows exemplary on-screen GUI 400 for removing a customized curriculum in accordance with one embodiment of the present invention. As shown in FIG. 4, region 410 may display information 420 related to the removal of a customized curriculum. For example, information 420 may indicate that removal of a customized curriculum may occur the next time device 210 is coupled to computer system 220. Additionally, in one embodiment, information 420 may indicate that a removal of the customized curriculum may cause the portable electronic device (e.g., 210) to implement the default or non-customized curriculum. Alternatively, information 420 may indicate that a removal of the customized curriculum may cause the portable electronic device (e.g., 210) to implement another customized curriculum.

Interaction with graphical object 430 may confirm removal of the customized curriculum. Region 410 may be hidden and GUI 300 may be re-presented (e.g., without a row corresponding to the removed curriculum) after interaction with graphical object 430 in one embodiment. Additionally, interaction with graphical object 440 may cancel the removal of the customized curriculum. Region 410 may be hidden and GUI 300 may be re-presented (e.g., with a row corresponding to the curriculum which was previously identified for removal) after interaction with graphical object 440 in one embodiment.

Figure 5:
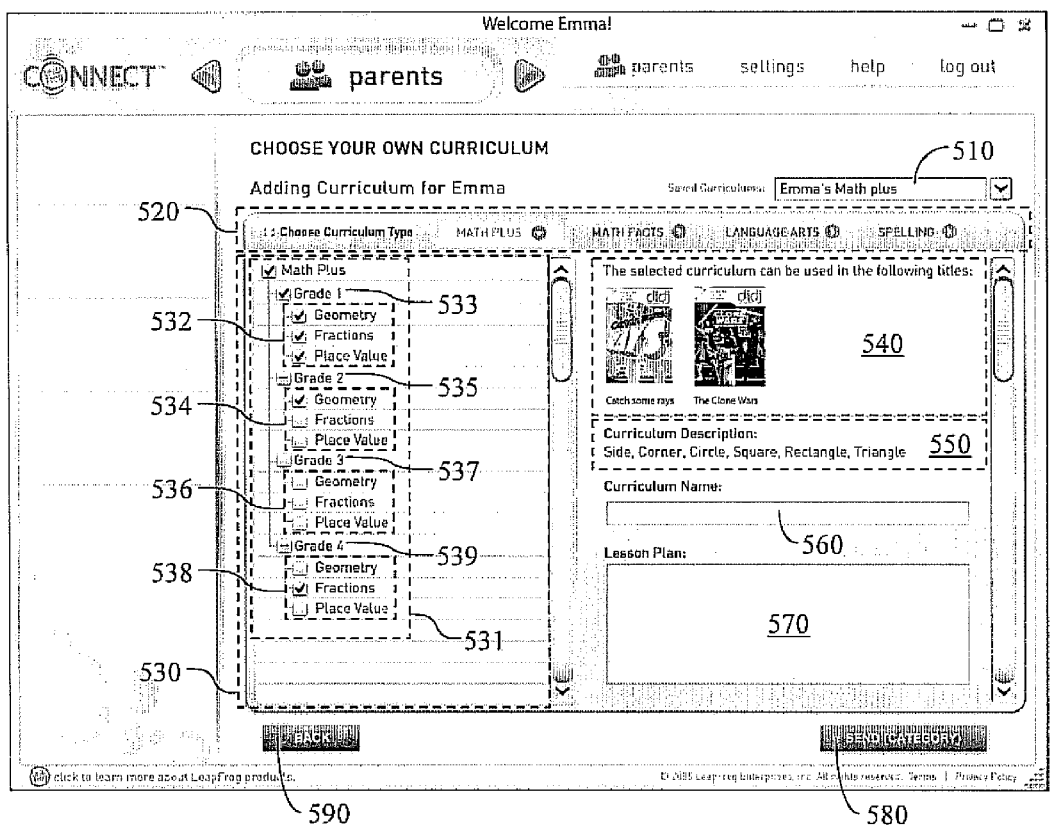
FIG. 5 shows an exemplary on-screen graphical user interface for customizing a curriculum by limiting the curriculum in accordance with one embodiment of the present invention.

FIG. 5 shows exemplary on-screen GUI 500 for customizing a curriculum by limiting the curriculum in accordance with one embodiment of the present invention. GUI 500 may be implemented by component 225 and/or component 235 of FIG. 2 in one embodiment. As shown in FIG. 5, graphical object 510 enables selection of a curriculum for customization. Graphical object 510 may be a menu, user-selectable list box, or other graphical object for presenting a list of selectable curriculums (e.g., those identified in column 330 of GUI 300) for customization.

GUI 500 also includes region 520 for selecting a sub-curriculum of the curriculum (e.g., selected using graphical object 510) for customization. Upon selection of a sub-curriculum, the selected sub-curriculum may be customized using regions 530-570. Once the curriculum is customized (e.g., by customization of at least one sub-curriculum of the curriculum), interaction with graphical object 580 may save the customized curriculum and/or prepare the customized curriculum for downloading to device 210 (e.g., upon connection of device 210 to computer system 220). Alternatively, interaction with graphical object 590 may cancel any unsaved modifications to the curriculum, hide the display of GUI 500, display GUI 300, or some combination thereof.

In one embodiment, downloading a customized curriculum (e.g., using graphical object 580) to the portable electronic device (e.g., 210) may overwrite or otherwise interfere with another customized curriculum (e.g., a previously-created customized curriculum which may be partially completed or fully completed). As such, a window or region (e.g., region 610 of GUI 600 of FIG. 6) may be presented with information warning a user that a previously-created customized curriculum may be overwritten by downloading a newly-created customized curriculum.

Figure 6:
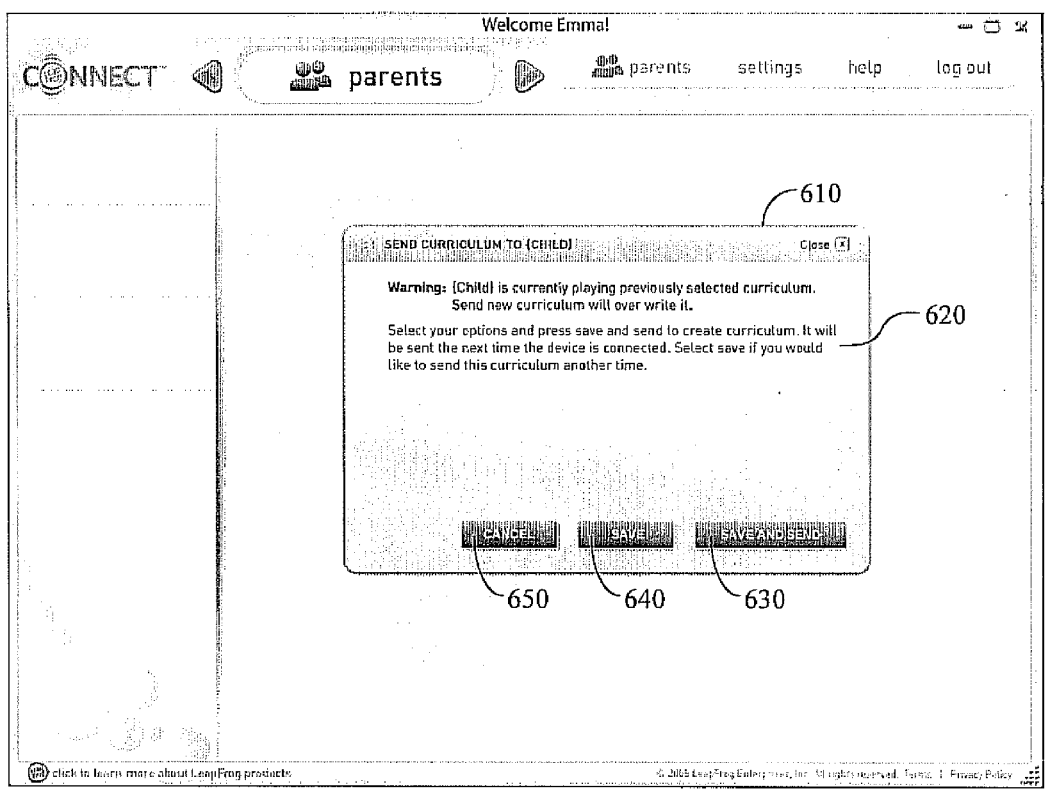
FIG. 6 shows an exemplary on-screen graphical user interface for saving and/or downloading a customized curriculum in accordance with one embodiment of the present invention.

FIG. 6 shows exemplary on-screen GUI 600 for saving and/or downloading a customized curriculum in accordance with one embodiment of the present invention. More specifically, region 610 may present information (e.g., information 620) warning a user that a previously-created customized curriculum may be overwritten by downloading a newly-created customized curriculum. Interaction with graphical object 630 may save the customized curriculum and prepare the customized curriculum for downloading to the portable electronic device (e.g., upon connecting device 210 to computer system 220). Alternatively, interaction with graphical object 640 may save the customized curriculum without preparing it for downloading to the device (e.g., 210), thereby enabling a user to initiate the download at a later time. In one embodiment, since the download of the customized content is not prepared by interaction with graphical object 640, a previously-created customized curriculum may not be overwritten in one embodiment. Additionally, interaction with graphical object 650 may cancel the saving the customized content and/or preparing the customized content for downloading to the device (e.g., 210).

Turing back to FIG. 5, region 530 enables selection of material or portions of the curriculum for inclusion in the customized curriculum. For example, each node of hierarchy 531 may correspond to a portion of the curriculum and may be selected or deselected by interacting (e.g., moving a mouse cursor over a node and clicking a mouse button) with a respective node. The nodes of hierarchy 531 may be organized into a plurality of hierarchy levels (e.g., nodes 532, 534, 636 and 538 may belong to a first hierarchy level, while nodes 533, 535, 537 and 539 may belong to a second hierarchy level), where parent nodes (e.g., nodes 532, 534, 636 and 538) may be expanded (e.g., to reveal child nodes) or collapsed (e.g., to hide child nodes). Interaction with a parent node (e.g., node 532) may select all child nodes belonging to that parent node (e.g., nodes 533) in one embodiment.

In one embodiment, nodes of the first hierarchy level (e.g., nodes 532, 534, 536 and 538) may be associated with respective grade levels, while nodes of the second hierarchy level may be associated with mathematical operations for each respective grade level. In this manner, the curriculum may be customized by limiting the curriculum to one or more grade levels (e.g., appropriate for a user of device 210), and further customized by selecting one or more mathematical operations (e.g., which the user of device 210 may be struggling with or has not mastered) for the customized curriculum.

Alternatively, nodes of hierarchy 531 may be associated with other characterizations or organizations of the curriculum. For example, the first hierarchy level (e.g., nodes 532, 534, 536 and 538) may be associated with game levels or activities. And in another embodiment, the first hierarchy level (e.g., nodes 532, 534, 536 and 538) may be associated with lesson plan goals or skills that the user (e.g., 210) may achieve by completing the respective portion of the curriculum. And in one embodiment, the first hierarchy level (e.g., nodes 532, 534, 536 and 538) may be associated with a subject such as mathematical division, and a hierarchy level below the first hierarchy level may be associated with problem types such as division by 5's.

As shown in FIG. 5, region 540 may be used to associate one or more content titles with the customized curriculum. For example, interaction with an icon corresponding to a content title may highlight or otherwise select the content title for association with the customized curriculum. Additionally, the content titles displayed in region 530 may be automatically determined and displayed in response to a selection of a sub-curriculum (e.g., from region 520).

Selection of different sub-curriculum may cause the icons displayed in region 540 to change in one embodiment. As such, a content title may be associated with a first sub-curriculum (or group of sub-curriculums) and not associated with a second sub-curriculum (or group of sub-curriculums). In this manner, the customized curriculum generated using GUI 500 (e.g., in response to interaction with graphical object 580) may be associated with multiple content titles, where only a portion of the customized curriculum (e.g., the portion corresponding to the respective sub-curriculum) may be implemented during execution of each content title. Further, it should be appreciated that one or more sub-curriculums may be associated with multiple content titles in one embodiment, and thus, the portion of the customized curriculum corresponding to the shared sub-curriculum may be implemented during execution of each content title.

As shown in FIG. 5, region 550 may display information about the selected sub-curriculum in one embodiment. Alternatively, region 550 may display information about a portion of the curriculum associated with a node of hierarchy 531 (e.g., a most-recently selected or highlighted node, etc.).

Region 560 may be used to enter a name or description for the customized curriculum. In one embodiment, the information entered in region 560 may be displayed in a respective row (e.g., corresponding to the customized curriculum) of column 330 in FIG. 3.

As shown in FIG. 5, region 570 may enable the entry of lesson plan information in one embodiment. Alternatively, information (e.g., related to the selected nodes of hierarchy 531) may be automatically displayed in response to interaction with hierarchy 531, thereby presenting information to users about the lesson plan (e.g., the current state of the customized curriculum or sub-curriculum).

Figure 7:
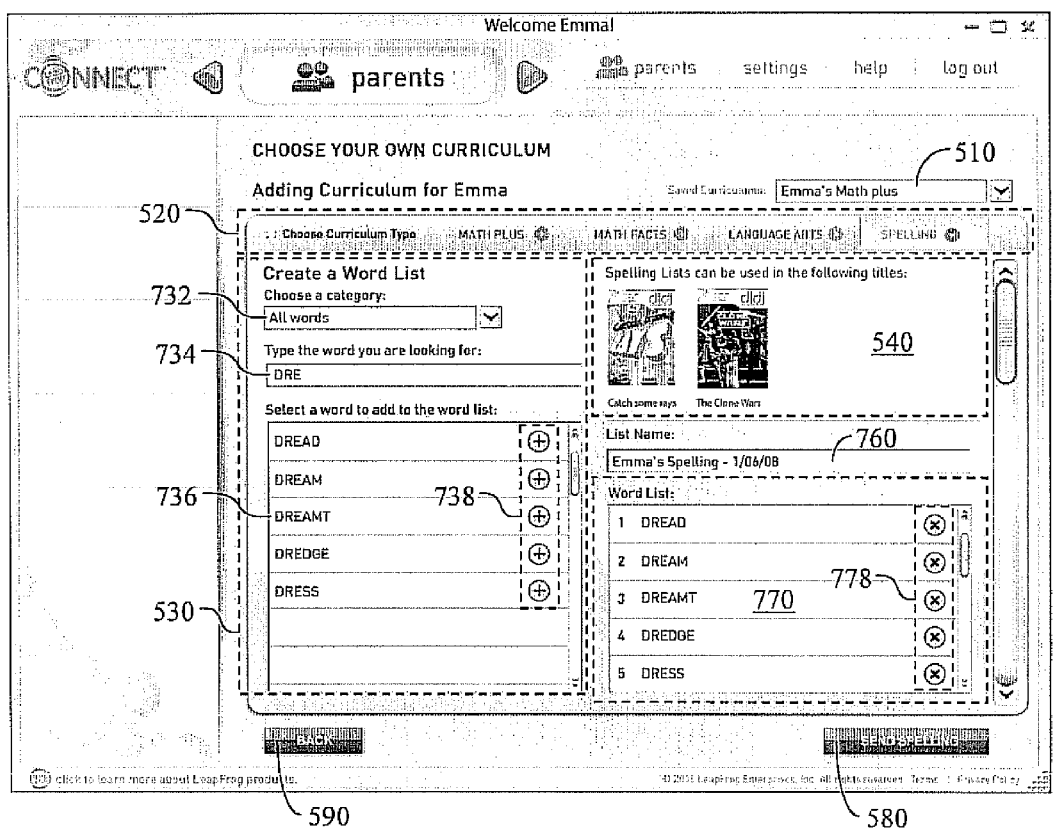
FIG. 7 shows an exemplary on-screen graphical user interface for customizing a curriculum by adding content to the curriculum in accordance with one embodiment of the present invention.

FIG. 7 shows exemplary on-screen GUI 500 for customizing a curriculum by adding content to the curriculum in accordance with one embodiment of the present invention. As shown in FIG. 7, region 530 may be used to select, enter, or otherwise add words to a spelling list displayed in region 770. The spelling list displayed in region 770 may be added to the customized curriculum (e.g., as a portion of the customized curriculum data) for implementation on a portable electronic device (e.g., 210) during execution of a content title (e.g., associated with the added content using region 540). In this manner, a first user (e.g., a parent) may add content for enabling a second user (e.g., a child of the parent) to learn or study the added content (e.g., corresponding to the child's weekly spelling test, etc.) using the portable electronic device (e.g., 210), where at least a portion of the added content is not included with the content title (e.g., words of the spelling list displayed in region 770 which are not coded in the content title) or is otherwise not organized or grouped in a manner indicated by the added content (e.g., words which may be coded in the content title, but which are not organized or grouped in accordance with the spelling list displayed in region 770).

A user may enter a word or a portion of a word into region 734 of region 530 to display words in region 736 of region 530. For example, entry of the letters "DRE" into region 734 may display words beginning with the letters "DRE" (e.g., DREAD, DREAM, etc.) in region 736. The words in region 736 may be added to the list in region 770 by interacting with a respective graphical object 738. Additionally, words may be removed from the list displayed in region 770 by interacting with a respective graphical object 778.

As shown in FIG. 7, region 732 of region 530 may be used to select a category of words for display in region 736. For example, if a category of "sports" is entered into region 732, then words related to the word "sports" may be displayed in region 736. Alternatively, region 732 may be used to filter words displayed in region 736 in conjunction with data entered into region 734. For example, if a category of "sports" is entered into region 732 and the letters "DRE" are entered into region 734, then only words related to sports that begin with or contain the letters "DRE" may be displayed in region 736 in one embodiment.

Region 760 may be used to name a previously-created spelling list in one embodiment. Alternatively, region 760 may be used to recall a previously-created spelling list (e.g., to be displayed in region 770), thereby enabling the previously-created spelling list to be modified using regions 530 and 770.

Although addition of content to the customized curriculum has been described in the context of spelling lists, it should be understood that this is merely exemplary and that the added content may take any form. For example, the added content may include other educational content (e.g., math problems, history questions, etc.). In one embodiment, the added content may include multiplication tables (e.g., specified by a parent for a child interacting with portable electronic device 210). Alternatively, the added content may include non-educational content (e.g., images, video, sounds, etc.). For example, avatars or other images, backgrounds, music, etc., may be created and added to the customized content. Additionally, the added content (e.g., avatars, backgrounds, music, etc.) may be added to or removed from the game play using the portable electronic device (e.g., 210) in one embodiment.

Figure 8A:
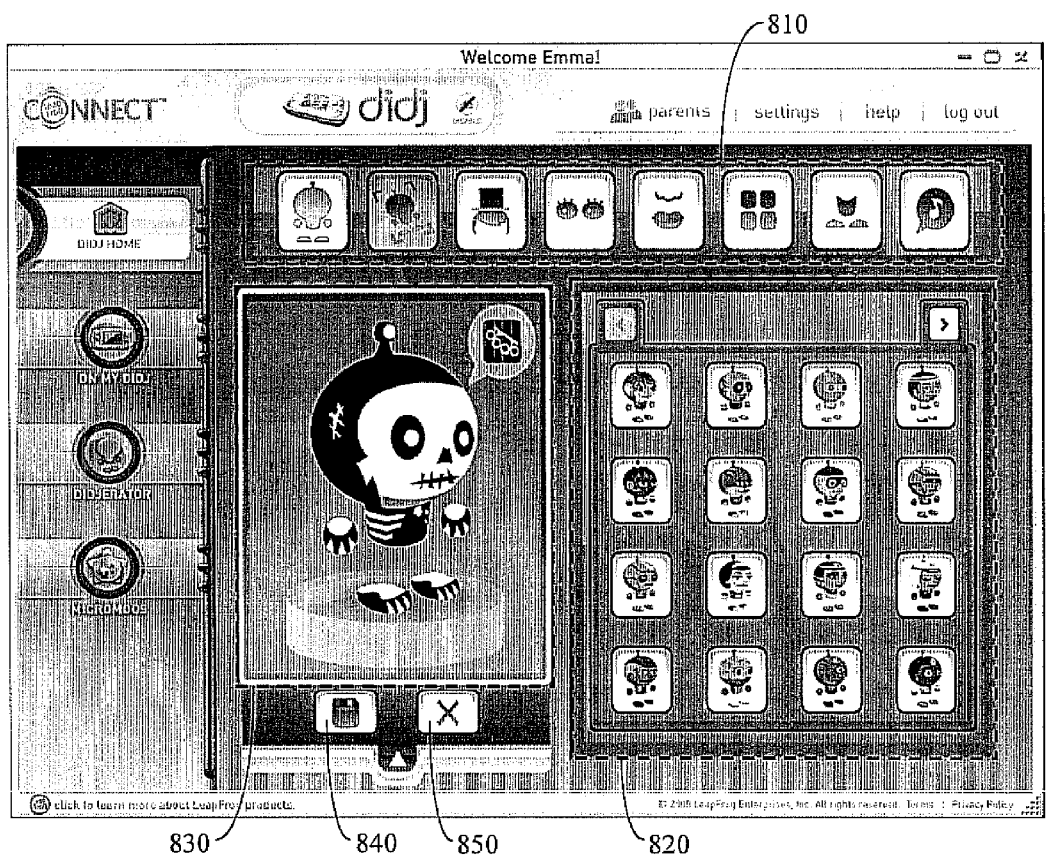
FIG. 8A shows an exemplary on-screen graphical user interface for creating and adding an image to a customized curriculum in accordance with one embodiment of the present invention.

FIG. 8A shows exemplary on-screen GUI 800a for creating and adding an image, e.g., an avatar, to a customized curriculum in accordance with one embodiment of the present invention. GUI 800a may be implemented by component 225 and/or component 235 of FIG. 2 in one embodiment. A shown in FIG. 8A, region 810 enables selection of various features (e.g., a body type, facial expression type, etc.) for customizing the avatar displayed in region 830. Region 820 may display various selectable options for customizing the avatar, where the options displayed in region 820 may be of a type selected in region 810. For example, selection of or interaction with an icon in region 810 for customizing the avatar's facial expression may display various facial expressions in region 820. Upon selection of a facial expression from region 820, the avatar in region 830 may be displayed with the selected facial expression. Additionally, graphical object 840 may be used to save the avatar (e.g., to include the avatar data into the customized curriculum for implementation on the portable electronic device), whereas graphical object 850 may be used to cancel customization of the avatar (e.g., discarding any changes to the avatar, returning to another GUI such as GUI 300 or GUI 500, etc.).

Figure 8B:
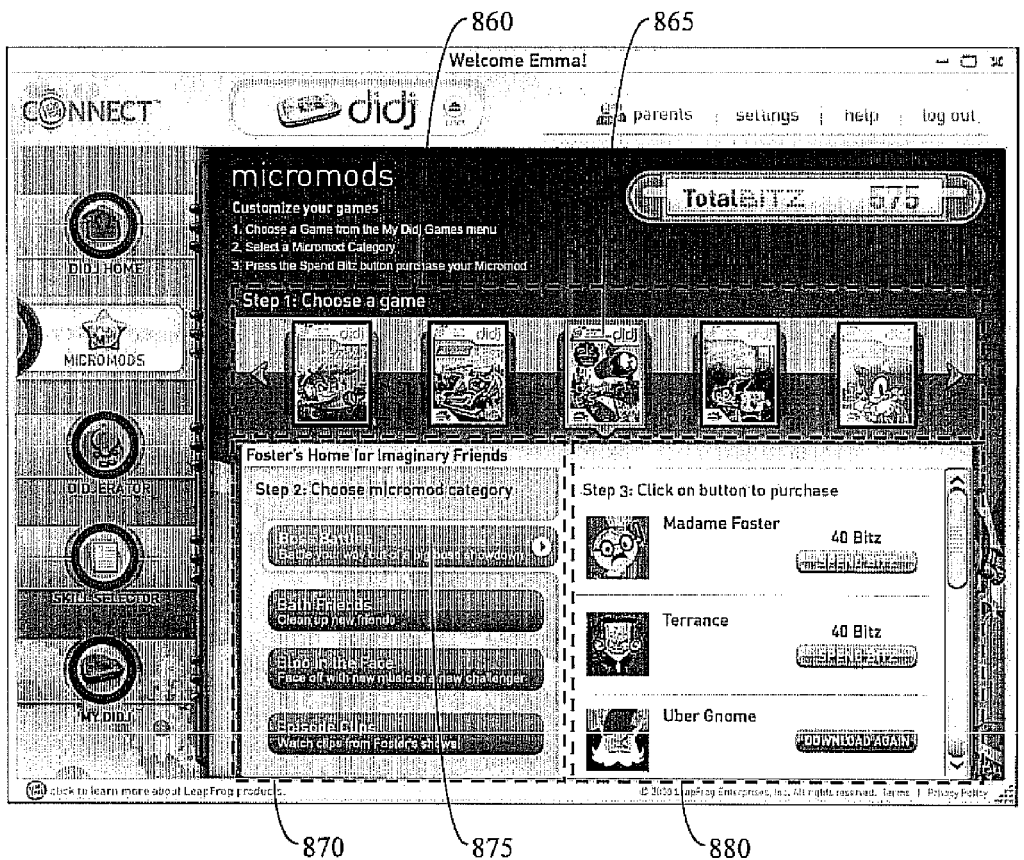
FIG. 8B shows an exemplary on-screen graphical user interface for selecting content for addition to a customized curriculum in accordance with one embodiment of the present invention.

FIG. 8B shows exemplary on-screen GUI 800b for selecting content for addition to a customized curriculum in accordance with one embodiment of the present invention. As shown in FIG. 8B, region 860 includes selectable content titles (e.g., for play or implementation on system 100, portable device 210, etc.) such as content title 865. Region 870 includes categories for customizing a content title (e.g., 865) selected from region 860. For example, each selectable category in region 870 may correspond to one or more formats of content (e.g., music, images, video, etc.). Alternatively, a selectable category (e.g., 875) of region 870 may correspond to bosses, enemies, or other characters which may be implemented within a game play (e.g., of selected content title 865 selected from region 860). Additionally, region 880 includes selectable content associated with the selected content category from region 870. For example, where selected content category 875 is associated with characters which may be implemented in content title 865, each of the selectable content in region 880 may be a different character which may be added to the game.

Figure 8C:
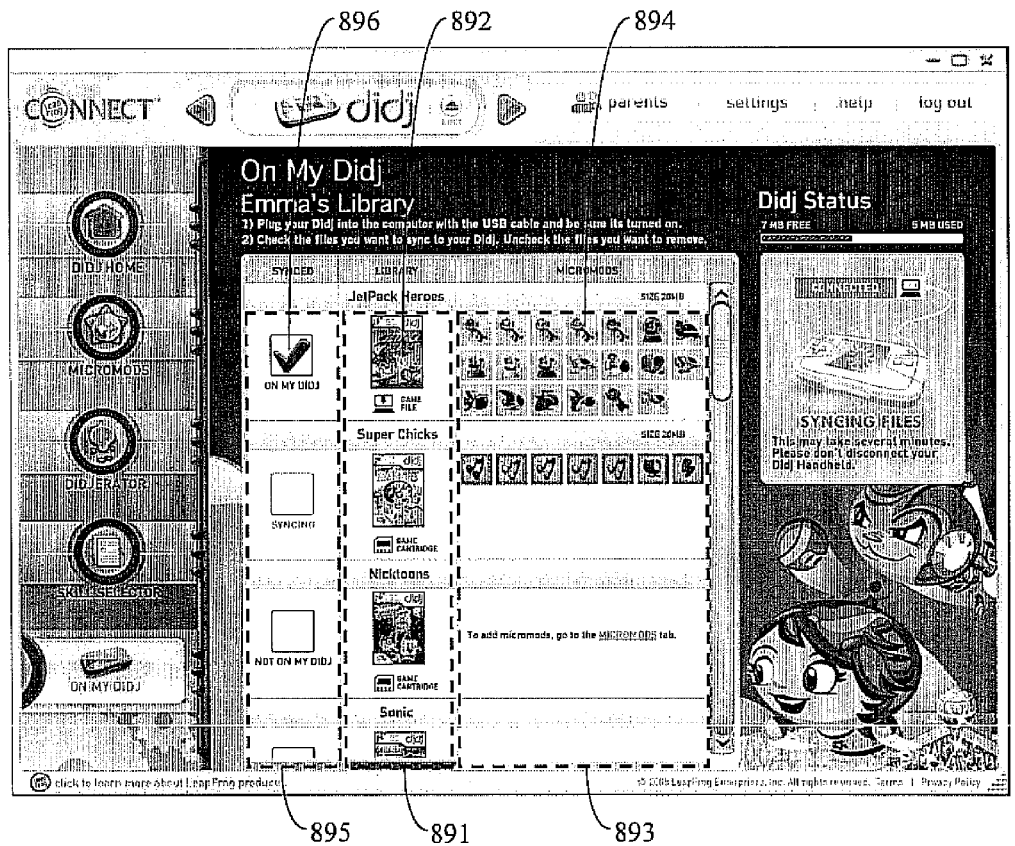
FIG. 8C shows an exemplary on-screen graphical user interface for downloading customized content in accordance with one embodiment of the present invention.

FIG. 8C shows exemplary on-screen GUI 800c for downloading customized content in accordance with one embodiment of the present invention. As shown in FIG. 8C, region 891 may display a list of content titles. In one embodiment, the content titles in region 891 may correspond to the selectable content titles displayed in region 860 of GUI 800b. Region 893 includes content associated with respective content titles of region 891. For example, content 894 may be associated with content title 892 in one embodiment.

Further, the content in region 893 may be associated with the selectable content displayed in region 880 of GUI 800b in one embodiment.

Region 895 includes a synchronization status for the content to be downloaded. For example, graphical object 896 may indicate that content 894 has been downloaded (e.g., to system 100, portable electronic device 210, etc.) and is ready for play by a user, thereby indicating that the selected content (e.g., 894, other content in region 893, etc.) has been "synchronized" between the device and a GUI (e.g., 800b, 800c, etc.) for selecting the downloadable content. Alternatively, graphical objects displayed in region 895 may indicate that the content is currently in the process of downloading or synchronizing, that the content has not yet begun to download or synchronize, etc.

Figure 9A:
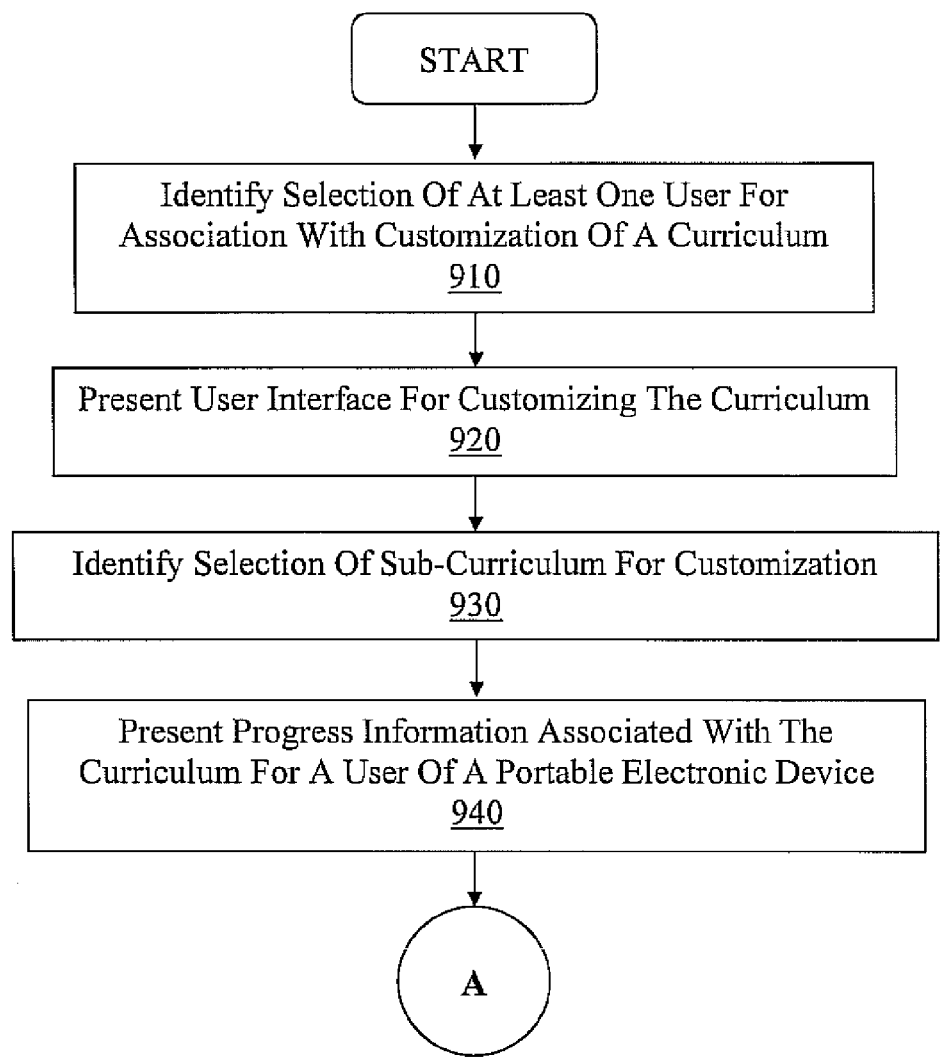
FIG. 9A shows a flowchart of a first portion of an exemplary computer-implemented process for customizing a curriculum for implementation on a portable electronic device in accordance with one embodiment of the present invention.
Figure 9B:
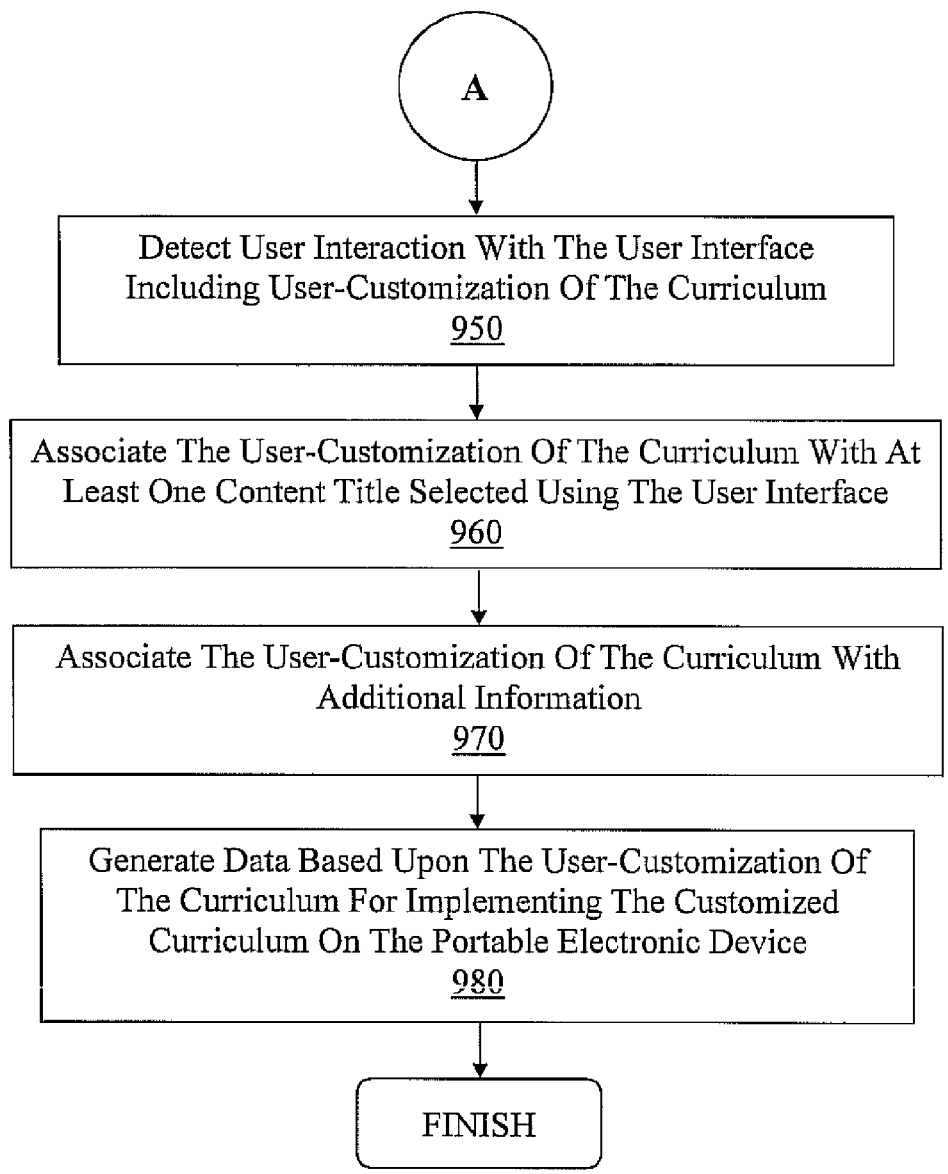
FIG. 9B shows a flowchart of a second portion of an exemplary computer-implemented process for customizing a curriculum for implementation on a portable electronic device in accordance with one embodiment of the present invention.

FIGS. 9A and 9B show a flowchart of exemplary computer-implemented process 900 for customizing a curriculum for implementation on a portable electronic device in accordance with one embodiment of the present invention. As shown in FIG. 9A, step 910 involves identifying a selection of at least one user for association with customization of a curriculum. A user may be selected, in one embodiment, by interacting with a graphical object associated with a user (e.g., graphical object 314 or 324, an identifier of a customized curriculum such as those depicted in column 330 of FIG. 3, etc.). Accordingly, at least one selected user may be automatically associated with a user-customization of the curriculum and/or any curriculum customization data generated therefrom.

Step 920 involves presenting a user interface for customizing the curriculum. For example, a GUI (e.g., 300, 500, 800a, 800b, 800c, etc.) may be presented in step 920, where the GUI is implemented using a component of a computer system (e.g., local customization component 225, web-based customization component 235, etc.).

As shown in FIG. 9A, Step 930 involves identifying a selection of a sub-curriculum for customization. The sub-curriculum may be one of a plurality of sub-curriculums of a curriculum to be implemented on a portable electronic device (e.g., 210). In this manner, embodiments enable customization of a curriculum through customization of individual sub-curriculums. Additionally, a sub-curriculum may be selected using a graphical object (e.g., in region 520 of GUI 500) associated with the sub-curriculum.

Step 940 involves presenting progress information associated with the curriculum for a user of a portable electronic device (e.g., 210). The progress information may be generated using usage data collected from the device (e.g., 210). In embodiment, the progress information may include at least one strength and/or at least one weakness of a user related to a curriculum implemented on the portable electronic device (e.g., 210). Additionally, the progress information may indicate how a user of the portable electronic device is progressing through material in one or more content titles (e.g., 215) playable or executable on the portable electronic device (e.g., 210).

As shown in FIG. 9B, step 950 involves detecting user interaction with the user interface (e.g., GUI 300, GUI 500, GUI 800a, 800b, 800c, etc.), where the user interaction includes user-customization of the curriculum. The user-customization of the curriculum may include at least one modification to the curriculum. For example, the user interaction may customize the curriculum by limiting the curriculum (e.g., as described with respect to FIGS. 5 and 6, to a specific skill or grade level, etc.), removing a portion or the whole customized curriculum (e.g., as described with respect to FIGS. 4 and 5), adding content to the curriculum (e.g., as described with respect to FIGS. 7 and 8), or some combination thereof. In one embodiment, the user-customization of the curriculum in step 950 may be performed in response to the presentation of progress information in step 940 of FIG. 9A).

Step 960 involves automatically associating the user-customization of the curriculum with at least one content title selected using the user interface. For example, content titles may be automatically displayed in a region (e.g., 540) of the user interface (e.g., GUI 500). One or more of the content titles may be selected to associate the customized curriculum with the one or more content titles (e.g., to enable implementation of the customized curriculum during execution of the one or more content titles on device 210).

Step 970 involves automatically associating the user-customization of the curriculum with additional information. The addition information may include a name or other identifier for the customized curriculum, which may then be displayed (e.g., in column 330 of GUI 300) to represent the customized curriculum and/or enable selection and modification of the customized curriculum. Additionally, the additional information may automatically be associated with the user-customization of the curriculum in response to entry of the additional information into the user interface (e.g., region 560 of GUI 500) in step 970.

As shown in FIG. 9B, step 980 involves generating data based upon the user-customization of the curriculum for implementing the customized curriculum on the portable electronic device (e.g., 210). It should be appreciated that a sub-curriculum of the customized curriculum may be implemented by an implementation of the customized curriculum. The curriculum customization data generated in step 980 may also include additional information associated with the customized curriculum in step 970 in one embodiment. Additionally, the customized curriculum may be implemented during execution of a content title associated with the user-customization of the curriculum in step 960 in one embodiment.

Figure 10:
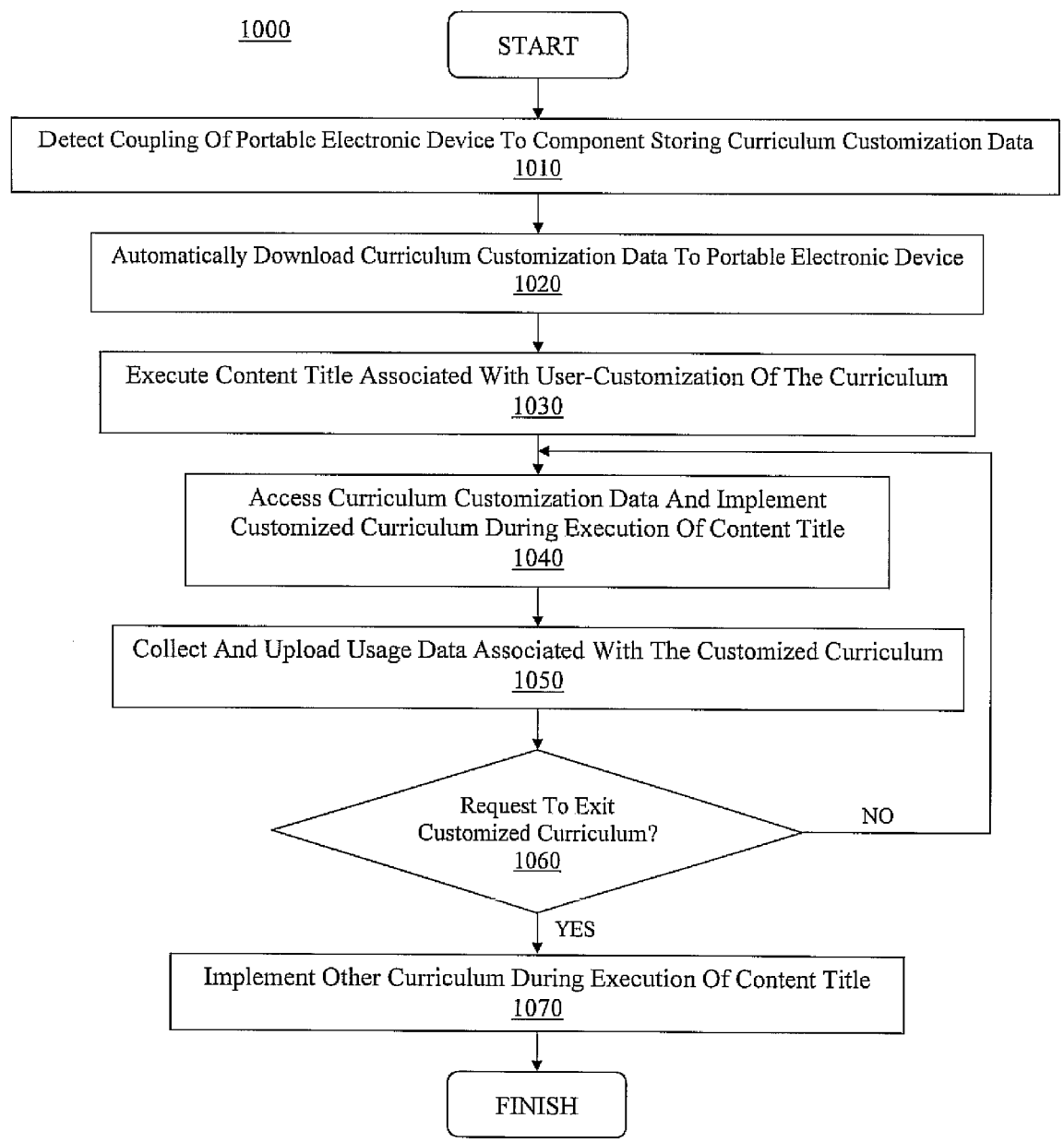
FIG. 10 shows a flowchart of an exemplary computer-implemented process for implementing customized curriculum on a portable electronic device in accordance with one embodiment of the present invention.

FIG. 10 shows a flowchart of exemplary computer-implemented process 1000 for implementing customized curriculum on a portable electronic device in accordance with one embodiment of the present invention. As shown in FIG. 10, step 1010 involves detecting a coupling of a portable electronic device (e.g., 210) a component storing curriculum customization data. The curriculum customization data may be generated by user interaction with a user interface (e.g., GUI 300, 500, 800*a*, 800*b*, 800*c*, etc.), where the interface is implemented using a component (e.g., 225, 235, etc.) of a system (e.g., 220, 230, etc.) separate from the portable electronic device (e.g., 210). The component storing the data may be located on or otherwise accessible to a computer system (e.g., 220) and/or a server (e.g., 230). The coupling may include establishing a communication interface (e.g., 240, 250, etc.) between the device (e.g., 210) and at least one other system (e.g., 220, 230, etc.). The established communication interface may be a universal serial bus (USB) interface (e.g., USB 1.0, USB 2.0, etc.), a Firewire interface, an Ethernet interface, a wireless interface, an interface which complies with another standard, or some combination thereof.

Step 1020 involves automatically downloading the curriculum customization data to the portable electronic device (e.g., 210). Step 1020 may be performed in response to the coupling of the device (e.g., 210) in step 1010. The curriculum customization data may be stored on a memory (e.g., 120) of the portable electronic device (e.g., 210).

As shown in FIG. 10, step 1030 involves executing a content title (e.g., 215) associated with user-customization of the curriculum. The content title may be stored locally on the portable electronic device (e.g., 210), be stored on a memory which is removably coupled with the portable electronic device (e.g., 210), etc.

Step 1040 involves accessing the curriculum customization data (e.g., from memory 120, streamed from system 220, streamed from server 230, etc.) and implementing the customized curriculum during execution of the content title (e.g., 215). In one embodiment, if a grade level was not selected (e.g., by interacting with at least one node of hierarchy 531 associated with a grade level) for the customized curriculum, then the content title (e.g., 215) and/or the device (e.g., 210) may automatically determine a grade level for a user based upon interaction of the user (e.g., correct answers, incorrect answers, etc.) with the device (e.g., 210). In this manner, the curriculum may be automatically customized (e.g., by implementing curriculum associated with the automatically-determined grade level) by the content title (e.g., 215) and/or the device (e.g., 210).

In one embodiment, a user (e.g., of portable electronic device 210) may be presented with a choice of a plurality of customized curriculum for implementation during step 1040. For example, a graphical user interface may be displayed on the portable electronic device (e.g., 210) which enables the user to select one or a plurality of customized curriculum for the game play. In response to the selection of the curriculum, the game play may commence in step 1040 and the selected customized curriculum may be implemented during the game play.

Step 1050 involves collecting and uploading usage data associated with the customized curriculum. The usage data may be collected while the customized curriculum is implemented and may include data related to user interaction with the customized curriculum. For example, the usage information may include the name of at least one content title played by a user, the curriculum (e.g., subject matter of the curriculum, games played within the content title, levels accessed by the user, etc.) accessed by a user, the number of correct answers, the number of wrong answers, the time spent on each content title, information about the levels accessed by the user, the number of times a user accessed a "hint" button or otherwise requested assistance, examples from the curriculum (e.g., an example of a question to which a wrong answer was provided) to provide context for the usage data, some combination thereof, etc. Additionally, the usage information (or progress information generated therefrom) may indicate a user's progress through one or more content titles, where the progress information include varying levels of detail (e.g., overall completion of the entire curriculum of the content title, completion of various levels or tasks related to one of the curriculums of the content title, etc.).

As shown in FIG. 10, step 1060 involves determining whether a request to exit the customized curriculum has been made. The request may be a user-generated request (e.g., made by a user of GUI 300, GUI 500, GUI 800*a*, 800*b*, 800*c*, etc., in response to generation of a new customized curriculum, removal of at least a portion of the existing customized curriculum, etc.) and/or a system-generated request (e.g., in response to a completion of the customized curriculum). If a request to exit the customized curriculum is not detected in step 1060, then steps 1040-1060 may be repeated (e.g., until a request is detected). If a request to exit the customized curriculum is detected in step 1060, then step 1070 may be performed.

Step 1070 involves implementing other curriculum during execution of the content title (e.g., 215). The other curriculum may include other customized curriculum (e.g., generated by user interaction with GUI 300, GUI 500, GUI 800a, 800b, 800c, etc. in accordance with process 900). Alternatively, the other curriculum may include non-customized curriculum such as default or standard curriculum associated with the content title. In one embodiment, step 1070 may be performed automatically in response to step 1060 (e.g., detecting a completion of the customized curriculum, etc.). Additionally, it should be appreciated that one or more of steps 1020-1070 may be repeated (e.g., in response to creation and download of other customized curriculum to be implemented during game play) after completion of step 1070.

Additionally, it should be appreciated that the customized curriculum (e.g., accessed in one or more steps of process 1000) may be downloaded to and/or implemented on multiple devices. For example, a teacher or parent may generate customized curriculum for multiple users (e.g., students, children, etc.). The customized curriculum may be downloaded to (e.g., in step 1020) and implemented on (e.g., in step 1040) the multiple devices, thereby enabling a first user (e.g., a teacher, parent, etc.) to generate customized curriculum for a plurality of other users (e.g., students, children, etc.). Additionally, it should be appreciated that the multiple users may use the same portable electronic device (e.g., 210) to interact with or access the customized content, or alternatively, the multiple users may use a plurality of portable electronic devices (e.g., 210) to interact with or access the customized content.

In the foregoing specification, embodiments of the invention have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of customizing a curriculum for implementation on a portable electronic device, comprising:
   presenting, by a computer system, a user interface for customizing said curriculum associated with at least one game that is operable on said portable electronic device;
   presenting a plurality of game titles from which a user can choose for customizing curriculum associated with the plurality of game titles;
   receiving a selection of at least one game title for customizing curriculum associated with the at least one game title;
   presenting a plurality of curriculum that can be customized for the at least one game title;
   in response to a selection of at least one curriculum of the plurality of curriculum that can be customized for the at least one game title, presenting the user interface for customizing the at least one curriculum;
   receiving a user-customization of the at least one curriculum of the plurality of curriculum for the at least one game title, said user-customization of the at least one curriculum for the at least one game title, comprising limiting one or more features of the at least one curriculum or removing some or all of previously-customized curriculum;
   associating, by the computer system, said user-customization of the at least one curriculum comprising limiting one or more features of the at least one curriculum or removing some or all of previously-customized curriculum, with the at least one game title that is operable on said portable electronic device;
   generating, by the computer system, data for implementing customized curriculum during execution of the at least one game title on said portable electronic device based upon said user-customization of the at least one curriculum; and
   downloading said data for implementing the customized curriculum during execution of the at least one game title on said portable electronic device, to said portable electronic device, when the computer system is coupled with the portable electronic device.

2. The method of claim 1, wherein the plurality of curriculum comprises a plurality of sub-curriculums, and further comprising:
   in response to a selection of a sub-curriculum of said plurality of sub-curriculums for customization, presenting said user interface for customizing said curriculum.

3. The method of claim 1 further comprising:
   presenting a list of at least one player profile associated with the portable electronic device;
   receiving a selection of at least one player from the list of at least one player profile for association with the customized curriculum; and
   automatically associating the customized curriculum with the at least one player.

4. The method of claim 1, wherein said customized curriculum comprises at least one modification to said curriculum, and wherein said at least one modification is selected from a group consisting of a limitation of said curriculum to at least one specific skill, a limitation of said curriculum to at least one skill associated with a user-specified grade level, an addition of content for presentation to a user of said portable electronic device, and a removal of at least a portion of said customized curriculum.

5. The method of claim 1 further comprising:
   uploading progress information from said portable electronic device; and
   presenting said progress information associated with said curriculum for a user of said portable electronic device, wherein said progress information is selected from a group consisting of at least one strength of said user related to said curriculum and at least one weakness of said user related to said curriculum.

6. The method of claim 1 further comprising:
   in response to entry of additional information into said user interface, automatically associating said additional information with said user-customization of the at least one curriculum; and
   presenting said additional information in said user interface to enable selection and modification of said user-customization of the at least one curriculum.

7. A method of implementing customized curriculum on a portable electronic device, said method comprising:
   in response to a coupling of said portable electronic device to a component storing curriculum customization data associated with at least one curriculum of a plurality of curriculum for at least one content title of a plurality of content titles, automatically downloading said curriculum customization data to said portable electronic device, wherein said curriculum customization comprises limiting one or more features of the curriculum or removing some or all of previously-customized curriculum, wherein said component is separate from said portable electronic device, wherein said component comprises a computer system operable to present a graphical user interface for generating said curriculum customization data, presenting a plurality of content titles from which a user can choose for customizing curriculum associated with the plurality of content titles, receiving a selection of at least one content title for customizing curriculum associated with the at least one content title, presenting a plurality of curriculum that can be customized for the at least one content title, in response to a selection of at least one curriculum of the plurality of curriculum that can be customized for the at least one content title, presenting the user interface for customizing the at least one curriculum, and wherein said curriculum customization data comprises a user-generated configuration for the at least one content title; and executing said at least one content title on said portable electronic device, wherein said executing comprises implementing said customized curriculum on said portable electronic device during execution of said at least one content title, wherein said implementing said customized curriculum further comprises implementing said customized curriculum based upon said curriculum customization data.

8. The method of claim 7 further comprising:
in response to a request to exit said customized curriculum, implementing non-customized curriculum on said portable electronic device during execution of said content title.

9. The method of claim 8, wherein said request to exit said customized curriculum is selected from a group consisting of an automatically-generated request based upon a completion of said customized curriculum and a user-generated request to exit said customized curriculum.

10. The method of claim 7, wherein said customized curriculum comprises at least one modification to a curriculum of said content title, and wherein said at least one modification is selected from a group consisting of a limitation of said curriculum to at least one specific skill, a limitation of said curriculum to at least one skill associated with a user-specified grade level, an addition of content for presentation to a user of said portable electronic device, and a removal of at least a portion of said customized curriculum.

11. The method of claim 7, wherein said content title comprises an educational game.

12. The method of claim 7, wherein said automatically downloading said curriculum customization data further comprises automatically downloading said curriculum customization data over an interface selected from a group consisting of universal serial bus (USB) interface, a Firewire interface, an Ethernet interface, and a wireless interface.

13. The method of claim 7 further comprising:
collecting usage information associated with said customized curriculum; and
uploading said usage information from said portable electronic device to said component for generation of progress information associated with said customized curriculum.

14. The method of claim 1 further comprising:
enabling selection of portions of said curriculum for inclusion in the customized curriculum.

15. The method of claim 1 wherein the curriculum comprises a hierarchy of nodes and wherein each node corresponds to a portion of the curriculum and the node may be selected or deselected by the user to customize said curriculum.

16. The method of claim 1 wherein the data is automatically downloaded to the portable electronic device in response to coupling the computer system with the portable electronic device.

17. The method of claim 1 further comprising:
presenting, by the computer system, a synchronization status for the data downloaded to indicate that the data has been downloaded.

18. The method of claim 1 further comprising:
presenting a plurality of game titles for which the user can choose to associate the user-customization of the at least one curriculum.

19. A computer system comprising:
a processor;
a memory coupled with the processor;
the memory comprising instructions to be executed by the processor to perform the following:
presenting a user interface for customizing said curriculum associated with at least one game that is operable on a portable electronic device;
presenting a plurality of game titles from which a user can choose for customizing curriculum associated with the plurality of game titles;
receiving a selection of at least one game title for customizing curriculum associated with the at least one game title;
presenting a plurality of curriculum that can be customized for the at least one game title;
in response to a selection of at least one curriculum of the plurality of curriculum that can be customized for the at least one game title, presenting the user interface for customizing the at least one curriculum;
receiving a user-customization of the at least one curriculum of the plurality of curriculum for the at least one game title, said user-customization of the at least one curriculum for the at least one game title, comprising limiting one or more features of the at least one curriculum or removing some or all of previously-customized curriculum;
associating said user-customization of the at least one curriculum comprising limiting one or more features of the at least one curriculum or removing some or all of previously-customized curriculum, with the at least one game title that is operable on said portable electronic device;
generating data for implementing customized curriculum during execution of the at least one game title on said portable electronic device based upon said user-customization of the at least one curriculum; and
downloading said data for implementing the customized curriculum during execution of the at least one game title on said portable electronic device, to said portable electronic device, when the computer system is coupled with the portable electronic device.

* * * * *